United States Patent
Sankur

(10) Patent No.: US 6,661,581 B1
(45) Date of Patent: Dec. 9, 2003

(54) GRADED INDEX MICROLENSES AND METHODS OF DESIGN AND FORMATION

(75) Inventor: Haluk Sankur, Ventura, CA (US)

(73) Assignee: Rockwell Scientific Company, Thousand Oaks, CA (US)

( * ) Notice: Subject to any disclaimer, the term of this patent is extended or adjusted under 35 U.S.C. 154(b) by 297 days.

(21) Appl. No.: 09/676,698

(22) Filed: Sep. 29, 2000

(51) Int. Cl.$^7$ ................................. G02B 27/10
(52) U.S. Cl. ................. 359/653; 359/619; 359/626; 359/637
(58) Field of Search ................ 359/652, 653, 359/654, 619, 628, 637, 626

(56) References Cited

U.S. PATENT DOCUMENTS

| | | | | |
|---|---|---|---|---|
| 4,518,222 A | * | 5/1985 | Borrelli et al. ............. | 359/620 |
| 4,805,997 A | | 2/1989 | Asahara et al. ............. | 350/413 |
| 4,952,037 A | | 8/1990 | Oikawa et al. ............. | 350/413 |
| 5,074,649 A | | 12/1991 | Hamanaka | |
| 5,143,659 A | * | 9/1992 | Hamblen et al. ............. | 264/1.1 |
| 5,310,623 A | | 5/1994 | Gal ............................. | 430/321 |
| 5,482,800 A | | 1/1996 | Gal | |
| 5,800,666 A | | 9/1998 | Bonham, Jr. et al. | |
| 5,926,319 A | | 7/1999 | Phillips et al. | |
| 6,027,672 A | | 2/2000 | Weitzel et al. | |
| 6,107,000 A | | 8/2000 | Lee et al. | |
| 2001/0048968 A1 | * | 12/2001 | Cox et al. .................... | 427/162 |

FOREIGN PATENT DOCUMENTS

EP 0918235 A2 5/1999

OTHER PUBLICATIONS

Zoran D. Popovic et al., *Technique for monolithic fabrication of microlens arrays*, Applied Optics, vol. 27, No. 7, Apr. 1, 1998, pp. 1281–1284.

D Daly et al., *The manufacture of microlenses by melting photoresist*, Meas. Sci. Technol., 1, (1990), pp. 759–766.

H. M. Presby et al., *Near 100 Efficient Fibre Microlenses*, Electronics Letters, vol. 28, No. 6, 12$^{th}$ Mar. 1992, pp. 582–584.

Christopher A. Edwards et al., *Ideal Microlenses for Laser to Fiber Coupling*, Journal Of Lightwave Technology, vol. 11, No. 2, Feb. 1993, pp. 252–257.

Ruediger Grunwald et al., *Microlens formation by thin–film deposition with mesh–shaped masks*, Applied Optics, vol. 38, No. 19, Jul. 1, 1999, pp. 4117–4124.

Rudiger Grunwald et al., *Axial Beam Shaping with Non-spherical Microoptics*, Jpn. J. Appl. Phys., vol. 37, (1998) Pt. 1, No. 6B, Jun. 1998, pp. 3701–3707.

R Grunwald et al., *Thin–film microlens arrays with non–spherical elements*, Pure Appl. Opt., 6 (1997), pp. 663–671.

Michael W. Farn, *Agile beam steering using phased–array-like binary optics*, Applied Optics, vol. 33, No. 22, Aug. 1, 1994, pp. 5151–5158.

(List continued on next page.)

*Primary Examiner*—Scott J. Sugarman
(74) *Attorney, Agent, or Firm*—Foley & Lardner

(57) ABSTRACT

A microlens has a material composition gradient that varies along the z-axis of the microlens to provide desired refractive properties in conjunction with the surface shape of the microlens. A method for designing the microlens may include defining a microlens surface shape, defining desired refraction properties of the microlens, and determining a refractive index gradient of the microlens in the direction of the z-axis using the desired refraction properties and the defined surface shape of the microlens. A method for fabricating the microlens may include depositing a material having a material composition gradient that is determined based on a lens shape and desired refractive parameters, and forming the microlens having the desired surface shape in the material.

34 Claims, 7 Drawing Sheets

OTHER PUBLICATIONS

M. Edward Motamedi, *Miniaturized micro–optical scanners*, Optical Engineering, vol. 33, No. 11, Nov. 1994, pp. 3616–3623.

Robert H. Dueck et al., *Optical design with inhomogeneous glass: The future is here*, SPIE, vol. 3130, Jul. 1997, pp. 32–40.

H. O. Sankur et al., *Micromachining Technology for Micro–Optics*, SPIE, vol. 4179, Sep. 2000, pp. 30–55.

PCT International Search Report as issued in International Application No. PCT/US02/42228, Mailing Date Dec. 6, 2002.

* cited by examiner

GRADED INDEX MICROLENSES AND METHODS OF DESIGN AND FORMATION

FIELD OF THE INVENTION

The invention pertains to microlenses, and in particular embodiments, to microlenses and methods of making microlenses having a refractive index gradient for providing desired refractive properties.

BACKGROUND

Microlenses are employed for collecting, focusing and steering light. Conventional microlens devices typically comprise an array of miniature spherical lenses that are formed on a substrate using conventional semiconductor processing techniques. FIGS. 1a–1c illustrate a conventional microlens formation process. In FIG. 1a, a layer of a lens material 20 such as silicon dioxide is formed on glass substrate 10. An array of photoresist cylinders 30 is formed over the layer of lens material. The photoresist 30 is then heated and reflowed, producing reflowed photoresist bodies 40 as illustrated in FIG. 1b. The surfaces of the bodies 40 formed in this are virtually spherical. Etching is then performed using a conventional etching process, such as reactive ion etching, that is particularly chosen to provide an approximately 1:1 photoresist to lens material etch ratio. As a result producing an array of spherical microlenses 50 is produced as illustrated in FIG. 1c. These conventional techniques are described in Z D Popovic, R A Sprague, G A N Connell, "Technique for monolithic fabriation of microlens arrays", Appl. Opt., 27, 1281–1284 (1988), and in D Daly, R F Stevens, M C Hutley, N Davies, "The manufacture of microlenses by melting photoresist", J Meas. Sci., 1, 759–766 (1990).

A disadvantage of spherical lenses is that they are not capable of aberration free focusing, that is, focusing light at a single point. FIG. 2 illustrates the convergence of rays of light exiting the flat base surface of a spherical lens. As seen in FIG. 2, rays 60 exiting from the outermost edges of the lens converge at a point 62 that is higher than the point of convergence 72 of rays 70 that exit the center of the lens. The narrowest spot size that can be produced by the lens occurs at the plane indicated by line A—A. Even at this plane, only a fraction of the refracted light is fully converged.

Variations on the conventional technique may be employed to produce lenses having aspherical cross-sections. For example, aspherical lenses can be formed by gray scale photolithogaphy. Aspheric lenses can also be formed by using a variation of the conventional photoresist reflow-and-etch process. In this method, the etch conditions are varied during etching, such that the spherical photoresist body produces an aspherical body in the substrate material.

These shaping techniques are limited in the degree of precision with which they can shape a lens surface, and consequently they are not able to tailor microlens refractive properties with the accuracy that would be desirable for current microlens applications. However, formation of spherical lenses by the melting or reflow is an easy and reliable technique and is desirable for those reasons.

SUMMARY OF THE DISCLOSURE

Embodiments of the invention overcome disadvantages of conventional microlenses and microlens fabrication techniques by employing a lens material having a refractive index that varies along its z-axis and shaping the microlens structure from such material by using, for example, conventional microlens shaping techniques. The gradient of the refractive index along the z-axis is designed to provide desired refractive properties in conjunction with the lens surface shape. Accordingly, the refractive properties of conventionally shaped microlenses are controlled with great precision through design and manipulation of the refractive properties of the lens material.

Embodiments of the invention relate to a method for designing and fabricating a microlens, wherein a lens surface shape is defined, desired refraction properties of the lens are defined, and a material is formed that has a refractive index gradient in the direction of the z-axis that is determined based upon the desired refraction properties and the defined surface shape of the lens. Further embodiments of the invention relate to a method for fabricating a microlens, wherein a material gradient providing a desired refractive index gradient is determined based upon a lens surface shape and desired refractive parameters, a graded index material having the material gradient is deposited, and a microlens having the desired surface shape is formed in the graded index material. Further embodiments of the invention relate to a microlens structure having a refractive index gradient in the direction of the z-axis for providing predetermined lens refractive properties in conjunction with the lens surface shape.

In accordance with an exemplary embodiment of the invention, the lens material may be deposited in a continuous deposition process, in which processing parameters such as deposition gas pressures or flow/evaporation rates are varied continuously to vary the composition of the deposited material layer and thereby vary the refractive index. Such graded refractive index thin films may be deposited with precision control for a wide range of materials by physical (i.e. evaporation) and chemical vapor deposition (e.g., MOCVD) techniques. Alternatively, the lens material may be comprised of discrete sub-layers having different refractive indices.

The lens material is chosen in accordance with the wavelength of light for which the lens is to be applied. Preferred embodiments of the invention for visible wavelength applications may employ silicon oxides $SiO_x$ or combinations of SiO and $TiO_2$. It is desirable to employ materials that provide a 1:1 etching ratio using a known etching technique.

Embodiments of the invention enable formation of lenses in accordance with desired refractive properties. A lens may be designed in accordance with an example embodiment of the invention by determining a desired lens shape, determining a refractive index gradient that will provide the desired convergence, and determining a lens material gradient that will provide the desired refractive index gradient. The refractive index gradient may be determined iteratively to minimize the error of simulated refractive properties relative to ideal desired refractive properties. A lens may be fabricated in accordance with an example embodiment of the invention by forming a lens material layer having a material gradient in the direction of the z-axis in accordance with a design as described above, and etching the material to form microlenses having a desired surface shape.

Microlenses in accordance with the invention have a wide range of applications such as beam steering, coupling, and image display.

DETAILED DESCRIPTION OF THE INVENTION AND PREFERRED EMBODIMENTS

Figure 1A:
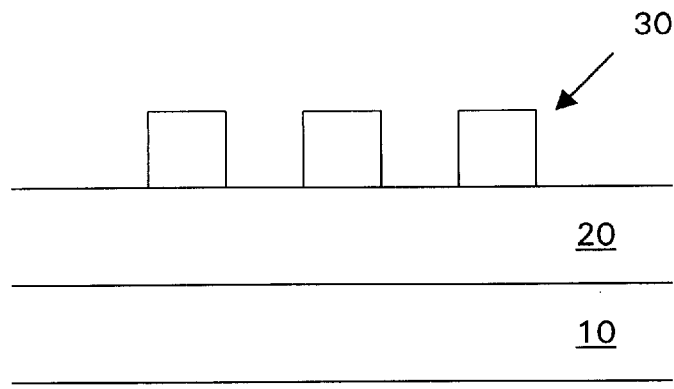
FIGS. 1a, 1b and 1c show structures in a conventional process for fabricating a microlens array.
Figure 1B:
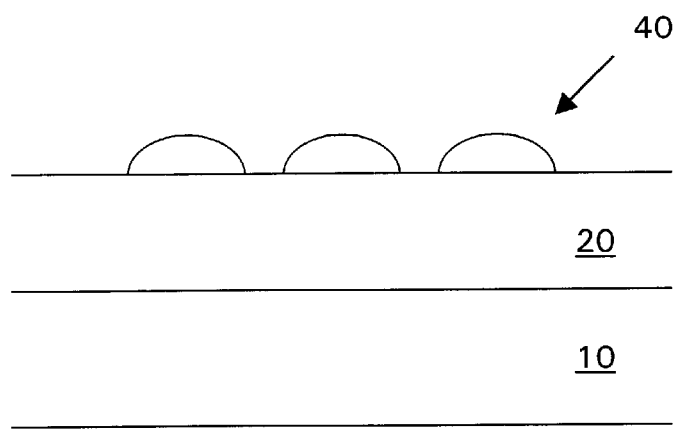
Figure 1C:
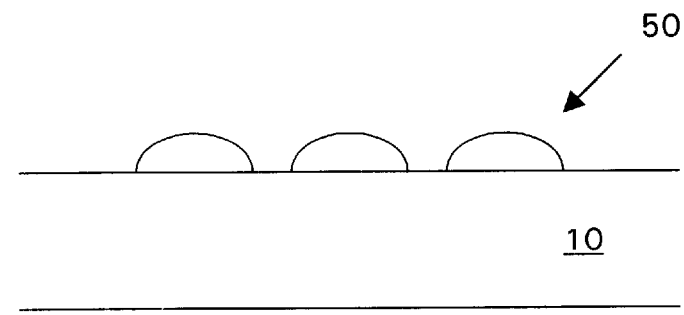
Figure 2:
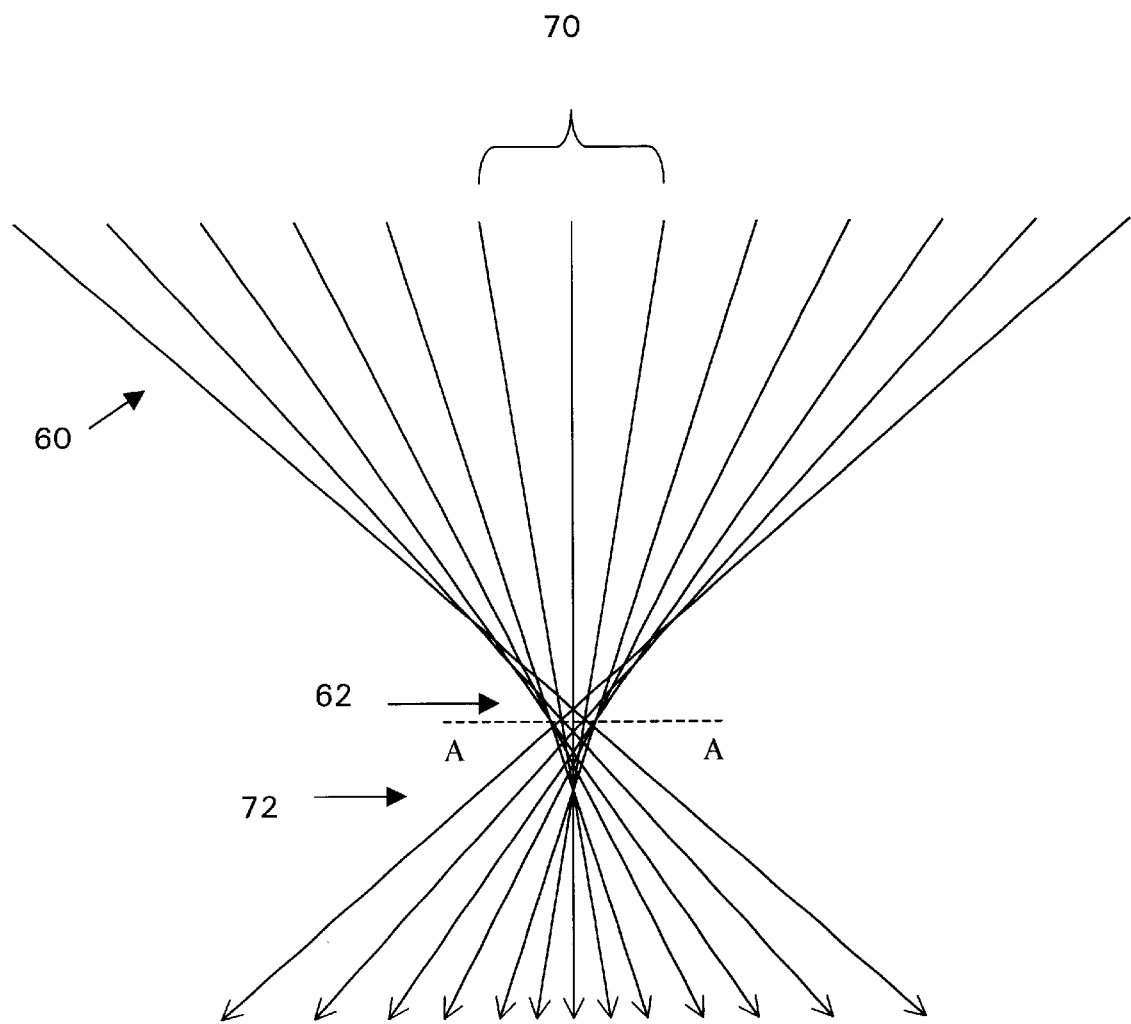
FIG. 2 shows light ray convergence in a conventional spherical microlens.
Figure 3:
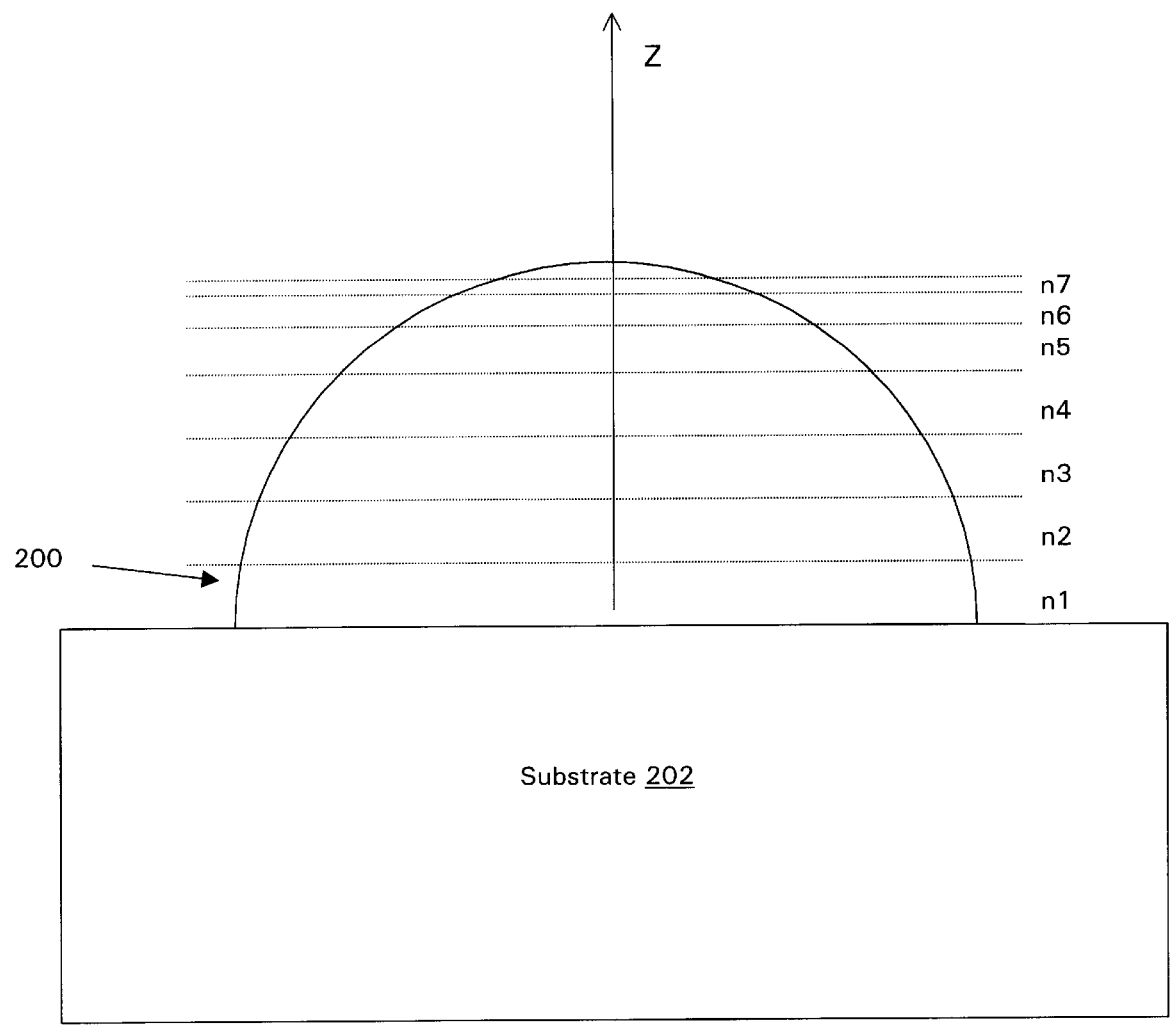
FIG. 3 shows an example of a microlens in accordance with the invention comprising multiple layers having different refractive indices.

FIG. 3 illustrates a first example of a spherical microlens in accordance with an embodiment the invention. The lens comprises a spherical body 200 formed on a substrate 202. The lens body is comprised of seven layers n1–n7 that are stacked vertically above the substrate layer. Each layer is composed of a material that is different in refractive index from the one below it. In this example, the lowest layer n1 is composed of $SiO_2$, which has a relatively low refractive index. The highest layer n7 is composed of a $SiO_2/TiO_2$ alloy that has a relatively high refractive index. The intermediate layers n2–n6 are composed of $SiO_2/TiO_2$ alloys of varying proportions, with the proportion of $SiO_2$ being high in layer n2 and progressively decreasing in succeeding layers.

The lens body 200 thus has a refractive index gradient that increases in the direction of the z-axis normal to the lens substrate. Light entering the lens at any point is refracted one or more times as it passes through the junctions between each layer. The layer thicknesses are chosen in accordance with desired refractive properties. In one type of application, the refractive properties may be chosen to provide a desired convergence of light passing through the lens. In another type of application, the layer thicknesses may be made equal to a quarter-wavelength of a given wavelength so that light having the given wavelength will be reflected and therefore dispersed by the curved surface of the lens.

Figure 4:
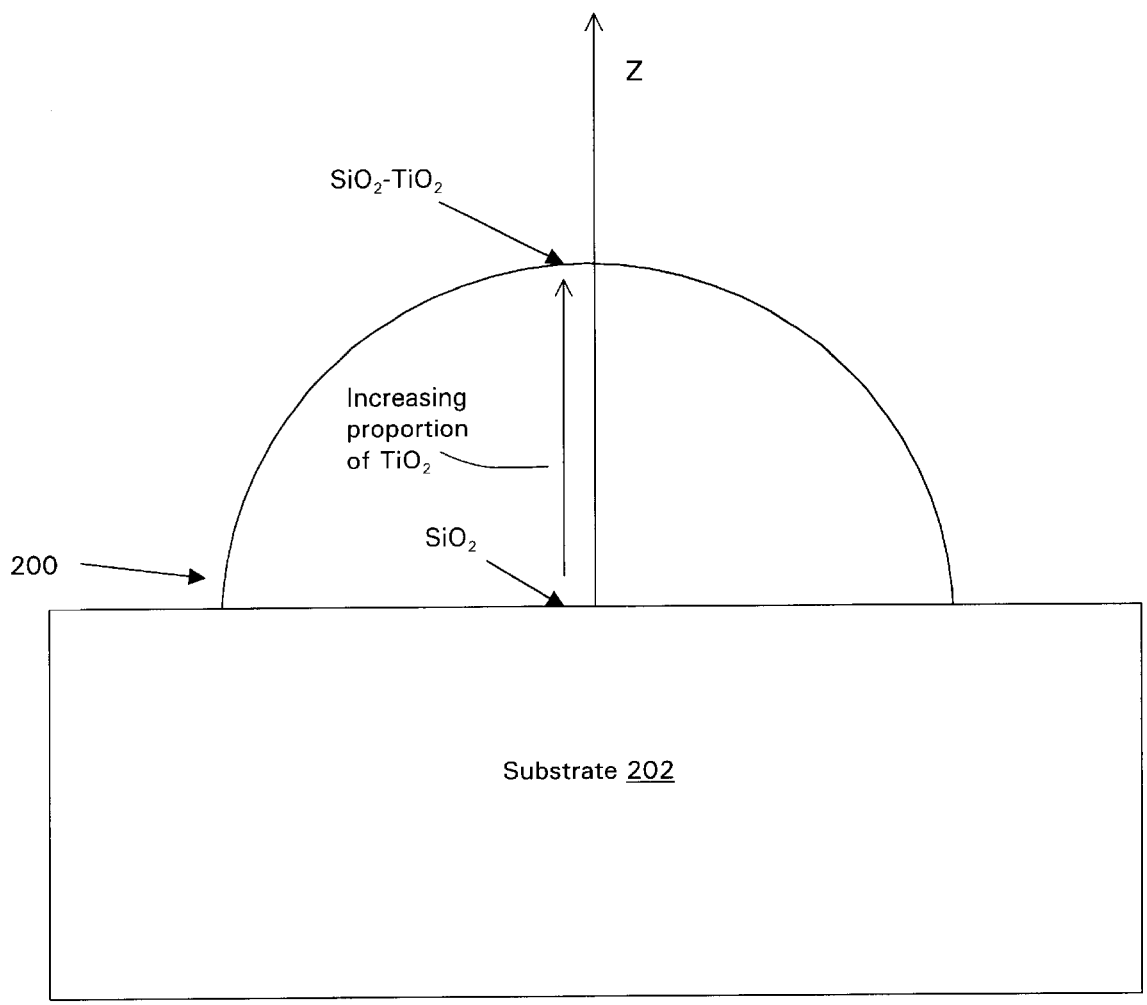
FIG. 4 shows an example of a microlens in accordance with an embodiment of the invention having a continuously variable refractive index.

FIG. 4 shows a preferred embodiment of a microlens in accordance with the invention. The microlens of FIG. 4 has a continuously variable refractive index gradient n(z) that varies as a function of the distance z from the substrate along the z-axis normal to the substrate. In this example, the lens material at the base of the lens is composed of $SiO_2$, and the lens material at the apex of the lens is composed of a $SiO_2/TiO_2$ alloy with a high refractive index. Between the base and apex, the lens material is composed of a $SiO_2/TiO_2$ alloy that varies in proportions in the direction. of the z-axis.

Figure 5:
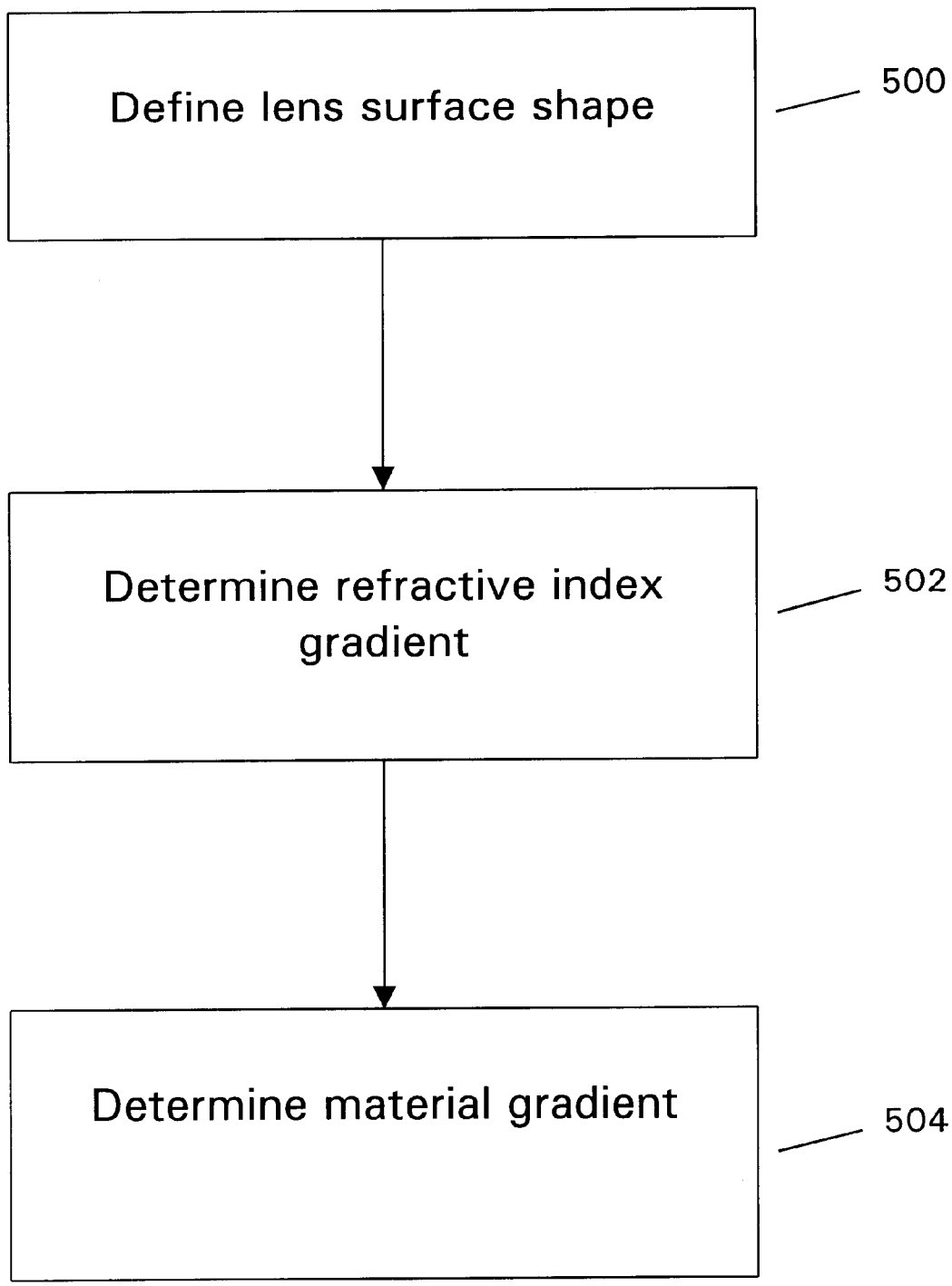
FIG. 5 shows a process for designing a lens in accordance with an embodiment of the invention.

The material composition gradient of a microlens may be determined through a design process as illustrated in FIG. 5. The process comprises defining 500 the surface shape of the lens body that will be fabricated, determining 502 a refractive index gradient for the lens body that will produce desired refractive properties given the lens surface shape, and determining 504 a material composition gradient providing the desired refractive index gradient. It will be appreciated by those of ordinary skill in the art that the functionality of a design process in accordance with embodiments of the invention may be implemented using a computing device in a variety of different manners.

An exemplary design process for designing the continuously variable index lens of FIG. 4 is now explained. Initially, the lens is defined to have a spherical surface, such as may be formed using the conventional photoresist reflow technique described above. Desired refractive properties are then defined. In this case, the lens is desired to provide aberration free focusing at a focal plane that is located a focal length f from the lens. A radius of curvature $R_C$ of the lens is determined in accordance with the desired focal length f such that:

$$R_C = f*(n-1)$$

where n is an average refractive index of the lens. Since the true average refractive index n is not known precisely at this stage of the design process, the value of n is initially assumed to be an average of refractive indices of materials that will presumptively be used at the substrate and at the apex of the lens surface. Thus, for example if the lens of FIG. 4 will use alloys of $SiO_2$ and $TiO_2$, the average refractive index n is the average of the refractive indices of the alloys that are expected to be used at the base and at the apex. Since the design process is iterative, as explained below, erroneous assumptions regarding these values will be corrected in the course of the iterations.

After a value for $R_C$ is determined, the paths of a representative sample of rays normal to the substrate and incident at various points on the surface of the lens are mapped. The angle of incidence $\alpha$ of a ray with respect to the normal to the surface at the point of incidence at a radial distance x from the center of the circular base is determined as:

$$\sin(\alpha) = x/R_C$$

The angle of refraction $\alpha'$, which is the angle of the ray relative to the normal to the surface that is produced as a result of refraction by the lens material, is determined by application of Snell's Law:

$$\sin(\alpha') = \sin(\alpha)/n(z)$$

where n(z) is the refractive index at the distance z of the point of incidence from the substrate.

The refractive index gradient function n(z) is assumed to be a polynomial:

$$n(z) = n_0 + a*z + b*z^2 + c*Z^3$$

where $_0$ is the refractive index of the substrate material, and a, b and c are coefficients that will be determined through the iterative process.

Beginning with the assumption that the coefficients equal zero, the paths of sample rays entering the surface of the lens are determined using Snell's Law and the refractive index provided by the polynomial gradient function. The lens may be treated as being composed of a large number of thin (infinitesimal at the limit) layers parallel to the substrate surface, each with a refractive index which is constant in the thin layer, but different from the neighboring layers in accordance with the function n(z) described above. By successively applying Snell's law at the interfaces, the paths of the rays through the layers is determined. Alternatively Snell's law can be applied once at the incident surface and a second time at the exit surface to determine the direction of the ray after the lens. This method, although not exact, produces a very small error (~1%) in most applications and is computationally much simpler.

Once all rays have been mapped to the plane of the desired focal point, their distances from the desired focal point at the plane of the focal point are determined. These errors are individually squared and the sum of the squared errors is determined. Subsequently, new values for the coefficients are assigned, and the sum of squared errors is again determined. This process is repeated, making adjustments to the coefficients each time, until coefficients providing a desired degree of error are determined.

The process described above may be altered in a variety of ways. For example, the exemplary process defined a fixed radius of curvature at the outset based on a desired focal length, and determined an optimal gradient for that focal length and radius by feeding back sample ray path errors to the gradient polynomial. However, the process may be altered such that only the radius of curvature is held constant, or such that only the focal length is held constant. Moreover, while the iterative process assumes the use of a spherical lens, other lens surface shapes may be employed. Further, while the above example employs a polynomial gradient function, other functions such as natural log functions or sine functions can be employed. Similarly, while a simple sum of squared errors optimization function was employed, alternative optimization functions may also be employed.

The implementation of the above example is designed to obtain aberration free focusing. However, alternative embodiments of the invention may be employed to emulate the refractive properties of any alternative lens profile or other desired refractive properties. For any desired refractive properties, ray positions are determined at the focal plane, and these ray positions are then used in the iterative process for purposes of error determination. In this way, a refractive index profile is determined that achieves the desired ray convergence or divergence. As an example, a lens having hyperbolic surface is desirable for efficiently coupling light to optical fibers, as described in H M Presby, C A Edwards, "Near 100% efficient fiber microlenses", Elect. Lett., 28, 582-4 (1992), and C A Edwards, H M Presby, C Dragone, "Ideal microlenses for laser to fiber coupling", J Lighwave Tech., 11, 252–257 (1993). Using the process described above, the refractive properties of a hyperbolic lens can be obtained through a spherical microlens with an appropriately designed refractive index gradient.

When a refractive gradient index has been determined in accordance with a given lens shape and refractive properties, this information is used to determine a material composition gradient for the lens material layer. A variety of materials are available for refracting different wavelengths. Where the lens body will be formed by etching, it is desirable for the materials used in combination to be capable of a 1:1 etch ratio under given etching conditions. Some combinations of materials that meet these criteria and their ranges of transparency are shown below:

| Material | Wavelength range (microns) | Refractive index range |
| --- | --- | --- |
| $SiO_x$ (1 < x < 2) | 0.6–2.5 | 1.45–1.9 |
| $SiO_2$—$TiO_2$ | 0.4–2.5 | 1.45–2.15 |
| $SiO_2$—$Ta_2O_5$ | 0.4–2.5 | 1.45–2.05 |
| $SiO_2$—$ZrO_2$ | 0.4–2.5 | 1.45–2.1 |
| Ge—ZnS | 2.0–16.0 | 2.26–4.0 |
| ZnS—$MgF_2$ | 0.4–6.0 | 1.35–2.25 |

The lens material is preferably formed in a single continuous processing step. For lenses as shown in FIG. 3, the layers n1–n7 may be formed sequentially in a single physical or chemical vapor deposition process in which the pressures and/or flow/evaporation rates of source materials are varied at the beginning of each layer to produce the desired composition. For the lens of FIG. 4, deposition parameters may be continuously varied to produce a material gradient providing the predetermined refractive index gradient. This is preferably achieved by evaporating one material (e.g., $SiO_2$) at a constant monitored rate, and evaporating a second material (e.g., $TiO_2$) that is varied taking into account 1) the desired index gradient requirements, 2) monitored rate of the other material, and 3) feedback from the optical properties of the mixed composition film on a monitor substrate. The deposited material is continuously monitored using one of the conventional monitoring techniques, such as laser reflectance, spectral reflectance, or ellipsometry.

After deposition of the material, the material is etched to form one or more lens bodies. Etching may be performed in accordance with the conventional processes described above by forming reflowed photoresist bodies above the deposited material and etching using the photoresist bodies as masks in the etching process. For all materials, it is important to use an etching process for which the materials have a 1:1 etch ratio. Further, where it is intended to replicate the shape of the photoresist body in the lens material, it is important to use an etching process for which the deposited material and the photoresist have a 1:1 etch ratio. The photoresist bodies may be formed directly on the deposited material, or intermediate layers may be employed in accordance with standard semiconductor processing techniques such as the use of antireflective coating (ARC) layers to improve photoresist exposure.

While the formation techniques of the embodiment described above provide one example of how the invention may be practiced, those of ordinary skill in the art will recognize a variety of other materials and techniques that may be employed in processes and structures in accordance with further embodiments of the invention.

Figure 6:
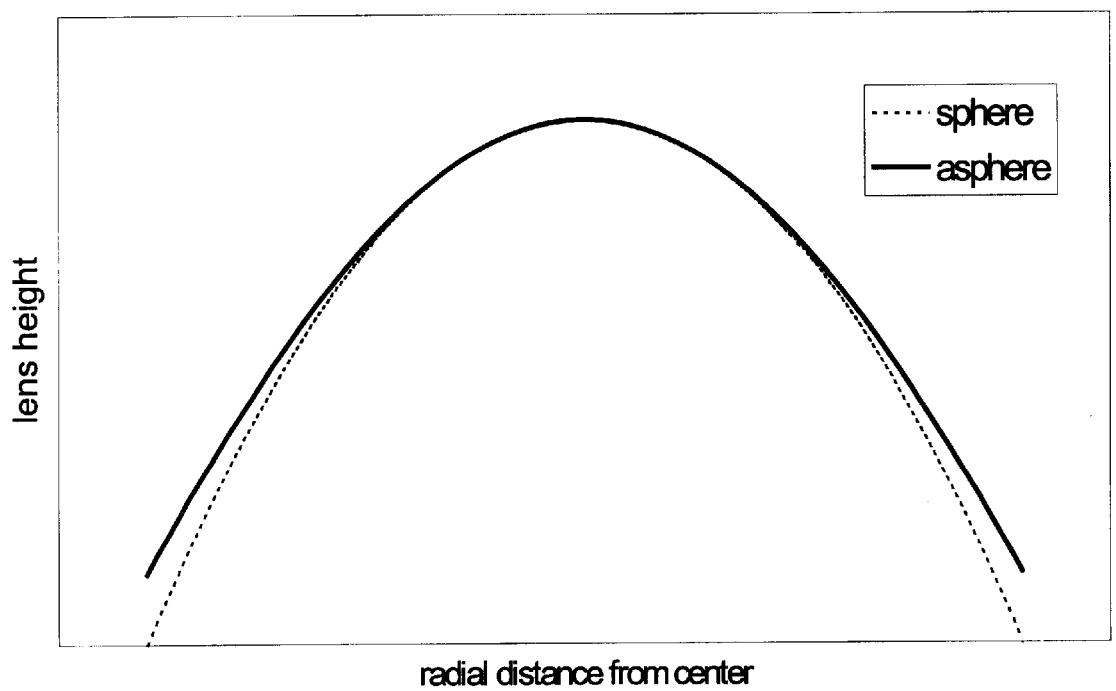
FIG. 6 shows the comparative geometries of a spherical and an aspherical lens surface.

With regard to the surface shape of the microlens, the example above describes the use of a spherical lens formed using the conventional photoresist reflow technique. However, aspherical surfaces may also be formed by varying the etch rate ratio of the material with respect to photoresist. Typical aspheric surfaces deviate slightly from a sphere and generally have 'flatter' curvature at the lens edge. FIG. 6 compares a spherical surface and an extremely aspherical surface chosen to illustrate the difference Similarly, while the base of the lens in the example is circular, other base shapes, including square or hexagonal, can also be formed by reflow or gray scale photolithography techniques.

As an alternative to the use of reflowed photoresist, the gray scale method of photomask formation may be employed. Gray scale photolithography uses a spatially variable transmission photomask to 'photosculp' the photoresist. The gray scale photomask may be made, for example, by half-tone design (see, for example, "Method for fabricating microlenses", U.S. Pat. No. 5,310,623) or using a special HEBS™ photomask material. The HEBS photomask can be locally darkened (written) by e-beam or laser exposure with varying degrees of grayness depending on the e-beam or laser dose. The photoresist then dissolves in the developer proportionately to the local UV dosage. Thus, a spatial optical density map in the photomask is converted to local photoresist height variations after exposure and development.

The lens structures of the examples described above were formed by etching a layer of lens material using a photo mask having the approximate structure of the desired lens. An alternative method of fabricating the lens body involves the process of deposition through a physical aperture. In this technique, a "shadow mask" is disposed between the deposition source and the substrate. The shadow mask is typically a thin metal plate having an array of holes formed therein. Deposition through the shadow mask produces bodies of deposited material that are aligned with the holes in the mask. Shadow mask techniques are described in various publications by Grunwald, including R Grunwald, H Mischke, W Rehak, "Microlens formation by thin-film deposition with mesh-shaped masks", Appl. Opt., 38, 4117–4124 (1999); R Grunwald, S Woggon, U Griebner, R Ehlert, W Reinecke, "Axial Beam Shaping with Nonspherical Microoptics", Jpn. J Appl. Phys., 37, 3701–3707, (1998); and R Grunwald, S Woggon, R Ehlert, W Reinecke, "Thin-film microlens arrays with non-spherical elements", Pure Appl. Opt., 6, 663–671, (1997). In accordance with an embodiment of the present invention, the source materials used in the shadow mask technique may be varied as described above to produce a refractive index gradient within the deposited lens bodies. It is noted that in this embodiment, the lens material does not reqiure a 1:1 etch ratio, because the lens shape is defined through the deposition process.

In the examples above, physical vapor deposition was used for forming the lens material. However, a variety of other conventional deposition techniques may be employed, including, but not limited to, plasma enhanced chemical vapor deposition (conventional, metal-organic, or plasma enhanced) and sputtering. In each instance, the composition of the deposited material may be altered by changing processing parameters.

Also, while the above embodiments used a predefined shaped and refractive properties to determine refractive index gradient of the microlens, in an alternative embodiment a reverse process may be employed. Specifically, given a material that has a refractive index gradient in the direction of the z-axis, a lens shape may be determined for providing desired refractive properties. A lens having the lens shape may then be formed in the material.

Microlenses in accordance with embodiments of the invention are useful in a wide variety of applications where optical elements are employed. In applications that use conventinal microlens arrays, such as beam steerers (see M W Farn, "Agile beam steering using phased-arraylike binary optics", Appl. Opt., 33, 5161–5168 (1994), and E Motamedi, A P Andrews, W J Gunning, M Khoshnevisan, "Miniaturized micro-optical scanners", Opt. Eng., 33, 3616–3623 (1994)), laser beam homogenizers, and exit pupil enhancers (see A J Stevens, H Urey, P Lopez, T R M Sales, R McGuire, D H Raguin, "Diffractive optical elements for numerical aperture expansion in retinal scanning displays", OSA meeting, 2000), the wavefront quality of the exiting beam is important, as the performance depends on the far field interference. Non-ideal surface shapes in these conventional microlens arrays generally result in energy loss to undesired diffraction orders or may form 'hot spots'. Such abberations may be corrected in accordance with embodiments of the present invention.

Figure 7:
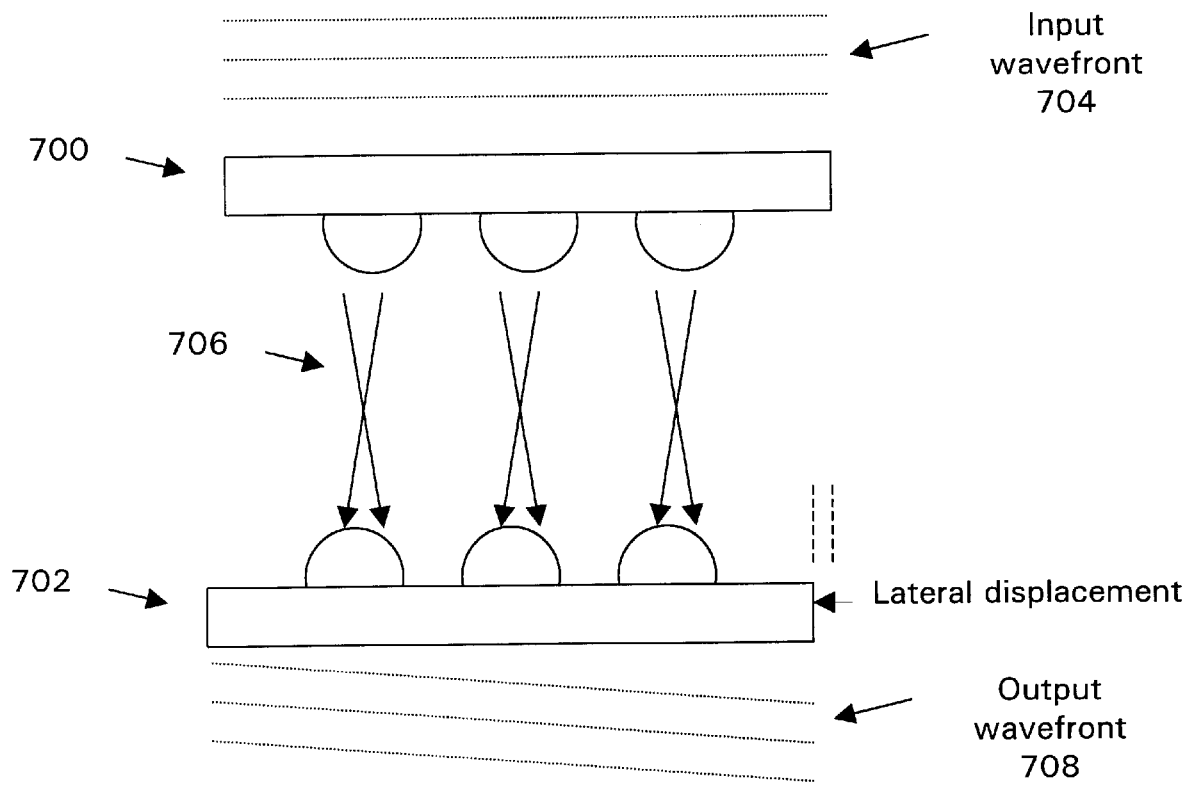
FIG. 7 shows an example of the use of the microlens of an embodiment of the invention in a beam steering application.

FIG. 7 shows a beam steering device employing microlenses in accordance with an embodiment of the invention. The beam steering device includes two opposed microlens arrays 700, 702. Collimated light, represented by wave fronts 704, enters and passes through the first aspheric microlens array 700 and is converged at convergence points 706. The light subsequently passes through the second microlens array 702.

In the illustrated configuration, the individual lens bodies of the microlens arrays are in alignment and so the light exiting the second array 702, represented by wave fronts 708, travels in the same direction in which it entered the first array 700. However, the light may be steered by moving either array laterally with respect to the other. For example, when the second array 702 is shifted leftward, the wave fronts exiting the second array 702 rotate clockwise, with the rotation increasing in proportion to the degree by which the array is shifted. Field lenses may be disposed between the two arrays to prevent light leaving one lens body of the first array 700 from straying to a different lens body of the second array 702. In beam steering applications, aspherical refraction is required because in the off-axis position, i.e. when one lens array is move laterally with respect to the opposing lens array, the rays from the first lenses are incident asymmetrically on the second lenses. The appropriate corrective refractive gradient may be implemented using embodiments of the present invention.

Microlenses in accordance with further embodiments of the invention are also useful for coupling of light into high numerical aperture fiber. In such applications, only rays within a certain cone will be accepted into the fiber. Other aberrated rays will come into the fiber opening at too steep an angle and will not undergo total internal reflection at the fiber core-cladding interface and therefore will not be transmitted in the fiber, resulting in insertion loss. As described above, the optimum lens shape for these applications is a hyperbolic shape, which is difficult to fabricate in a microlens using conventional technology. However, an effective hyperbolic profile may be achieved with a spherical lens body and an appropriate refractive index gradient.

Microlenses in accordance with further embodiments of the invention are also useful in detector arrays. In a detector array, an a microlens is provided in correspondence with each detector of the array. It is desirable to minimize the cross-talk among individual detector elements. Because it produces a smaller spot size at the focal plane than a conventional microlens, the microlens in accordance with the invention reduces the amount of light leaking to an adjoining detector. Accordingly, a detector array employing a microlens in accordance with the present invention produces images that are sharper in color and in edge acuity.

The present invention is also useful for any other applications that require a high degree of collimation or focusing by a microlens, or tailoring of the wavefront emerging from a microlens. For example, microlenses in accordance with the invention may be used to provide a high quality wavefront in an exit pupil enhancer.

While certain embodiments of the invention have been described above, many variations and additional applications will be apparent to those skilled in the art. The appended claims are intended to cover all applications and embodiments that fall within the true spirit and scope of the invention.

What is claimed is:

1. A method for fabricating a microlens comprising:
    defining a microlens surface shape;
    defining desired refraction properties of the microlens; and
    continuously depositing a microlens material while varying deposition parameters to form a continuously varying microlens material composition such that the microlens material has a refractive index gradient in the direction of the z-axis for producing the desired refraction properties in conjunction with the defined microlens surface shape.

2. The method claimed in claim 1, wherein depositing the microlens material is preceded by determining a material composition gradient providing the refractive index gradient.

3. The method claimed in claim 2, wherein determining a material composition gradient comprises determining a wavelength of light to be refracted and determining a material composition in accordance with the determined wavelength.

4. The method claimed in claim 1, wherein the refractive index gradient is determined by minimizing a deviation of sample rays passing through the microlens body with respect to a desired focal point by iteratively adjusting parameters of a function representing the refractive index gradient.

5. The method claimed in claim 1, wherein the microlens surface shape is one of spherical and aspherical.

6. The method claimed in claim 1, wherein the microlens surface shape is spherical and the refractive properties comprise hyperbolic refractive properties.

7. The method claimed in claim 1, wherein the microlens surface shape is spherical and the refractive properties comprise aberration free focusing.

8. The method claimed in claim 1, wherein the microlens surface shape is spherical with a circular base.

9. The method claimed in claim 1, wherein the microlens surface shape is spherical with a square base.

10. A microlens, comprising:
a substrate; and
a microlens body formed on the substrate and comprising a material deposited during a continuous deposition process while varying a composition of the material during the deposition process using varying processing parameters such that the material has a refractive index gradient in the direction of the z-axis providing predetermined refractive properties in conjunction with a surface shape of the microlens body.

11. The microlens claimed in claim 10, wherein the material is composed of constituents that vary in proportion in the direction of the z-axis.

12. The microlens claimed in claim 11, wherein the constituents have an approximately 1:1 etch ratio.

13. The microlens claimed in claim 10, wherein the surface shape is one of spherical and aspherical.

14. The microlens claimed in claim 10, wherein the refractive index is continuously variable in the direction of the z-axis.

15. The microlens claimed in claim 10, wherein the material comprises one of $SiO_x$, $SiO_2$—$TiO_2$, $SiO_2$—$Ta_2O_5$, $SiO_2$—$ZrO_2$, Ge—ZnS, and ZnS—$MgF_2$.

16. The microlens claimed in claim 10, wherein the surface shape is spherical and the refractive properties comprise hyperbolic refractive properties.

17. The microlens claimed in claim 10, wherein the surface shape is spherical and the refractive properties comprise aberration free focusing.

18. The microlens claimed in claim 10, wherein the surface shape is spherical with a circular base.

19. The microlens claimed in claim 10, wherein the microlens surface shape is spherical with a square base.

20. A method of forming a microlens, comprising:
determining a refractive index gradient in the direction of the z-axis of a deposited material having a material composition gradient in the direction of the z-axis, the material being deposited during a single deposition process while varying a composition of the material during the deposition process using varying processing parameters;
determining a microlens shape providing desired refractive properties in conjunction with the refractive index gradient; and
forming a microlens having the shape in the material.

21. The method claimed in claim 1, wherein the deposition parameters comprise at least one of a deposition gas pressure and a flow/evaporation rate.

22. The method claimed in claim 1, wherein continuously depositing a microlens material while varying deposition parameters comprises monitoring a composition of the deposited microlens material and varying deposition parameters in response to the composition.

23. The method claimed in claim 22, wherein monitoring comprises optically monitoring the deposited material.

24. The method claimed in claim 21, wherein the flow/evaporation rate of at least one vapor is varied during deposition.

25. The method claimed in claim 1, wherein the microlens material comprises one of $SiO_x$, $SiO_2$—$TiO_2$, $SiO_2$—$Ta_2O_5$, $SiO_2$—$ZrO_2$, Ge—ZnS, and ZnS—$MgF_2$.

26. The method claimed in claim 1, wherein depositing a microlens material comprises depositing the microlens material using chemical vapor deposition (CVD).

27. The method claimed in claim 26, wherein depositing a microlens material comprises depositing the microlens material using physical vapor deposition (PVD).

28. A method for fabricating a microlens comprising:
defining a microlens surface shape;
defining desired refraction properties of the microlens; and
sequentially forming layers of a microlens material during a single varying deposition process to form a continuously varying refractive index gradient in the direction of the z-axis for producing the desired refraction properties in conjunction with the defined microlens surface shape.

29. The method claimed in claim 28, wherein the microlens material comprises one of $SiO_x$, $SiO_2$—$TiO_2$, $SiO_2$—$Ta_2O_5$, $SiO_2$—$ZrO_2$, Ge—ZnS, and ZnS—$MgF_2$.

30. A method for fabricating a microlens comprising:
defining a microlens surface shape;
defining desired refraction properties of the microlens; and
forming a microlens from a microlens material during a single varying formation process by varying a composition of the microlens material during the formation process using varying processing parameters such that the microlens material has a refractive index gradient in the direction of the z-axis for producing the desired refraction properties in conjunction with the defined microlens surface shape.

31. The method claimed in claim 30, wherein the processing parameters comprise at least one of a deposition gas pressure and a flow/evaporation rate.

32. The method claimed in claim 30, wherein the microlens material comprises one of $SiO_x$, $SiO_2$—$TiO_2$, $SiO_2$—$Ta_2O_5$, $SiO_2$—$ZrO_2$, Ge—ZnS, and ZnS—$MgF_2$.

33. A method for fabricating a microlens comprising:

defining a microlens surface shape;

defining desired refraction properties of the microlens; and forming a microlens material having a refractive index gradient in the direction of the z-axis for producing the desired refraction properties in conjunction with the defined microlens surface shape;

wherein the microlens surface shape is spherical and the refractive properties comprise hyperbolic refractive properties.

34. A microlens, comprising:

a substrate; and a microlens body formed on the substrate and comprising a material deposited during a continuous deposition process while varying a composition of the material during the deposition process using varying processing parameters such that the material has a refractive index gradient in the direction of the z-axis providing predetermined refractive properties in conjunction with a surface shape of the microlens body;

wherein the surface shape is spherical and the refractive properties comprise hyperbolic refractive properties.

* * * * *